July 17, 1928.
A. E. SANTSCHI
1,677,214
ELECTRICALLY HEATED APPARATUS
Filed July 19, 1926
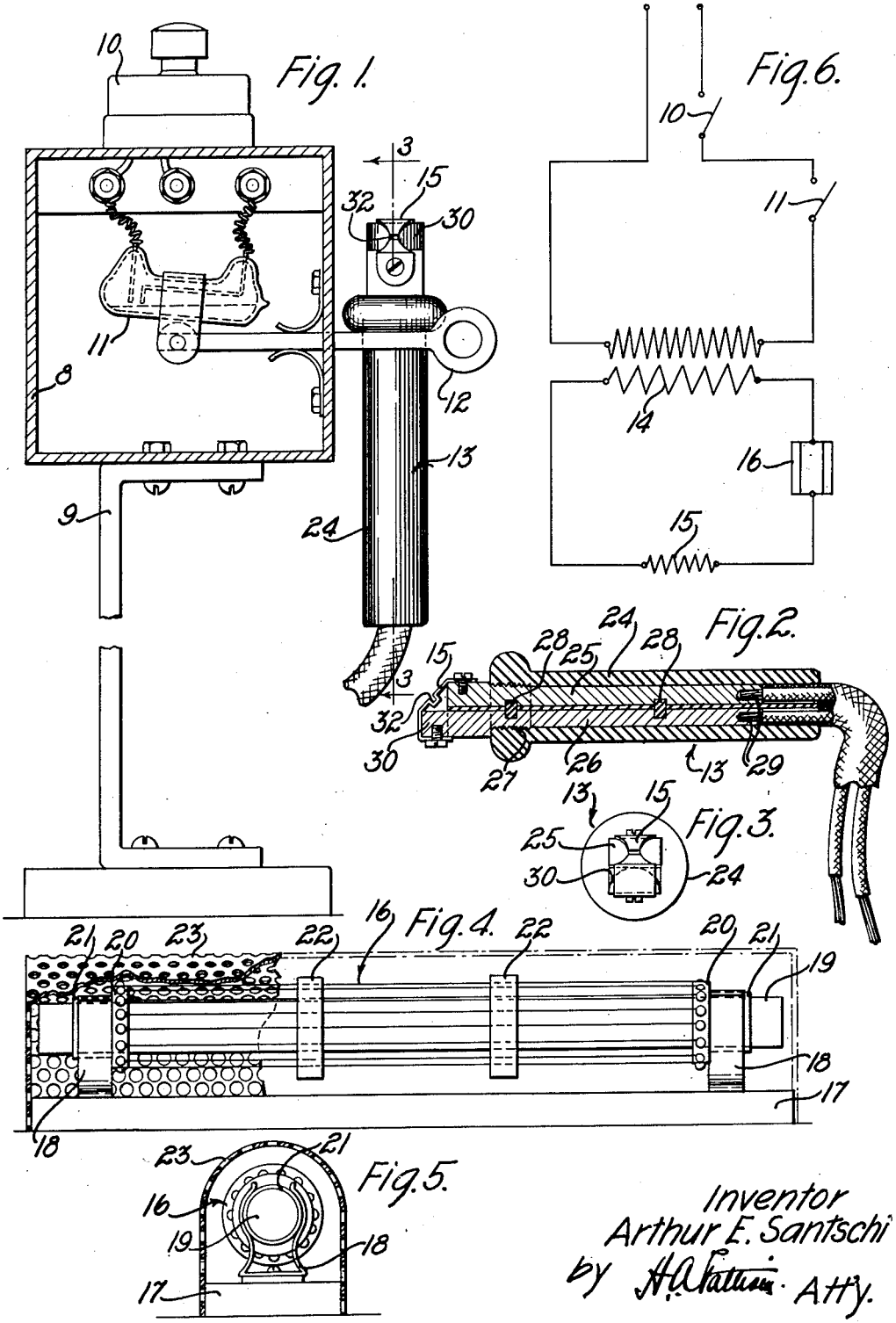
Inventor
Arthur E. Santschi
by H.A.Fatham. Atty.

Patented July 17, 1928.

1,677,214

UNITED STATES PATENT OFFICE.

ARTHUR EDWIN SANTSCHI, OF CHICAGO, ILLINOIS, ASSIGNOR TO WESTERN ELECTRIC COMPANY, INCORPORATED, OF NEW YORK, N. Y., A CORPORATION OF NEW YORK.

ELECTRICALLY-HEATED APPARATUS.

Application filed July 19, 1926. Serial No. 123,423.

This invention relates to electrically heated apparatus, and more particularly to electrically heated soldering apparatus for intermittent use.

An object of the invention is to provide an electrically heated apparatus having a heating element which may be quickly brought to the desired temperature and retained at that temperature without overheating.

The invention contemplates the provision of means in a heating circuit for allowing a large initial flow of current to quickly bring the temperature of the heating element to the desired value and then reducing the current to such a value as to retain the element at that temperature while in use. In accordance with one embodiment, the invention is applied to a soldering iron for soldering wires and especially fine wires in the winding of electrical coils for telephone and other apparatus. In this embodiment an element having a high positive temperature coefficient is placed in the heating circuit which will allow a large initial current to flow to quickly bring the soldering iron from a cold condition to the soldering temperature and as the element becomes heated due to the current its resistance increases and limits the current to such a value as to retain the iron at the proper soldering temperature.

It is believed that a better understanding of the invention may be had by reference to the following description taken in conjunction with the accompanying drawing, in which Fig. 1 is a side elevation of a switch box showing the soldering iron on the hook in its inoperative position;

Fig. 2 is a detail view of the soldering iron taken on the line 3—3 of Fig. 1;

Fig. 3 is an end view of the soldering iron shown in Fig. 2;

Fig. 4 is a detail view of the current regulating element with the hook broken away to show the element;

Fig. 5 is an end view of the element shown in Fig. 4 with the ends of the hood omitted, and Fig. 6 is a diagram of the electrical circuit of the apparatus.

Referring to the drawings in which similar parts are designated by the same numerals in the several views, a switch box 8 (Fig. 1) is mounted on a standard 9. The switch box supports two switches, a hand switch 10 and a mercury switch 11 of any well known type which is operated by a hook 12 adapted to hold a soldering iron 13 when not in use.

A current regulating device 16 shown in Figs. 4 and 5 is mounted on a base 17 of insulating material, provided at each end with a clip 18 adapted to receive the current regulating device which is made in the form of a cartridge and comprises a core 19 of asbestos board carrying two brass rings 20—20 which are provided with reduced portions 21—21 to be engaged by the clips 18—18. Between the rings 20—20 a number of commercially pure nickel wires are stretched, the number of which may be varied accordingly as it is desired to increase or decrease the time required to bring the iron to the desired temperature. In order to space the wires and also to provide an additional support therefor, two rings 22—22 of insulating material are mounted on the core through which the wires are threaded. The entire regulating device is covered by a perforated steel hood 23 to guard against contact with the nickel wires which may become quite hot when in use.

The soldering iron consists of a tube 24 of insulating material which serves as a handle or grip and has at one end an annular enlarged portion to adapt it to be suspended on the hook 12. Two copper electrodes 25 and 26 separated by insulating material pass through the interior of the tube. The portions of the electrodes inside of the tube are semi-circular in cross section so that together they form a cylinder which completely fills the tube, one end of the cylinder thus formed being threaded as indicated at 27 to hold the electrodes in the tube. Two cylindrical keys 28—28 of insulating material which fit in similarly shaped cavities serve to keep the electrodes in longitudinal alignment and terminals 29—29 of a cable are soldered into one end of the electrodes by which the soldering iron may be connected to a heating circuit to be described later. A portion of each of the electrodes projecting from the other end of the tube is rectangular in cross section, one of which portions has an extension 30, which is semi-circular in cross section as shown in Fg. 4. The electrodes are connected to a heating element 15 which consists of a natural metallic alloy known as Monel metal whose composition is approximately 67% nickel, 28% copper and 5% other metals, chiefly iron, magnesium, and silver, which has a high resistance and will therefore heat quickly. In a restricted portion of the heating element a small loop 32 is provided large enough to receive the wires to be soldered. This loop will attain the highest temperature due to the fact that it is located in the most restricted part of the heating element. Since the resistance metal of the heating element has a low specific heat it will be quickly cooled when the current is interrupted which together with the fact that it is connected to the large copper electrodes which conduct the heat from the element allows the element to become cool enough to be touched without burning within a few seconds.

A diagram of the soldering circuit is illustrated in Fig. 6 showing the current regulating device 16 and the heating element 15 in series in the secondary of the transformer 14, the primary circuit of which includes switches 10 and 11. When the soldering iron is on the hook 12 the mercury switch 11 is open and no current will flow in the primary circuit. Upon the removal of the soldering iron from the hook the mercury switch will close the primary circuit and a current will be caused to flow in the secondary circuit to heat the element 15. The switch 10 serves as an additional safeguard to open the primary circuit when the apparatus is not in use over an extended period.

The invention has particular application in the manufacture of coils used in telephone and radio apparatus which are usually formed of fine wire. When the operator reaches the end of a spool or a break occurs and wishes to join the ends of the wires, the soldering iron is removed from the hook which automatically operates the mercury switch to close the primary circuit and the ends of the wires are located in the depressed portion 32. When the primary circuit is closed there is a large initial rush of current through the secondary circuit due to the low resistance of the nickel wires in the current regulating device when cold. However, since the nickel wires have a high positive temperature coefficient their resistance will increase rapidly as their temperature increases and by the time that the heating element of the soldering iron has attained the proper temperature the resistance of the current regulating device will have increased sufficiently to allow only enough current to pass to maintain the heating element at the soldering temperature. After the wires have been securely soldered the soldering iron is again placed on the hook, opening the primary circuit and disconnecting the source of electrical energy. It has been found that the heating element may be brought to the soldering temperature within a few seconds and will also cool quickly upon the disconnection of the heating current.

It will be understood that the embodiment of the invention herein described and illustrated is merely a convenient and useful form of the invention, which is capable of many other modifications without departing from the spirit and scope of the invention.

What is claimed is:

1. In an electrically heated apparatus, an electric circuit, an element of high resistance material in said circuit, and means to allow a large initial current to heat said element and reduce the current when the element is sufficiently heated to retain it at the proper temperature.

2. In a soldering apparatus, an electric circuit including a heating element of high resistance material and a current regulating means in said circuit comprising an element having a positive temperature coefficient to allow a large initial flow of current and reduce the current as the element becomes heated.

3. In a soldering apparatus, an electric circuit, a heating element of resistance material in the circuit comprising two end portions, and a restricted central portion provided with a loop to receive the material to be soldered.

4. In a soldering apparatus, an electric circuit, a soldering iron in said circuit comprising a hollow handle, a pair of electrodes having a portion occupying the interior of the handle and a portion projecting therefrom, and a heating element attached across the projecting portions of the electrodes.

5. In a soldering apparatus, an electric circuit, a soldering iron in said circuit comprising a hollow handle, a pair of electrodes having a portion occupying the interior of the handle and a portion projecting therefrom, means to keep the electrodes in fixed relation, and a heating element connecting the projecting portions of the electrodes.

6. In a soldering apparatus, an electric circuit, an element of high resistance material in said circuit for engaging the work during the soldering operation, and a current regulating means in series therewith in said circuit comprising an element having a positive temperature coefficient to allow a large initial current to flow to the element thereby heating the element and to reduce the current as the element becomes heated.

In witness whereof, I hereunto subscribe my name this 30th day of June A. D., 1926.

ARTHUR EDWIN SANTSCHI.